(12) United States Patent
Hippler et al.

(10) Patent No.: US 11,982,744 B2
(45) Date of Patent: May 14, 2024

(54) OPERATING METHOD AND CONTROL UNIT FOR A LIDAR SYSTEM, LIDAR SYSTEM, AND DEVICE

(71) Applicant: Robert Bosch GmbH, Stuttgart (DE)

(72) Inventors: Markus Hippler, Stuttgart (DE); Martin Kastner, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 769 days.

(21) Appl. No.: 17/080,449

(22) Filed: Oct. 26, 2020

(65) Prior Publication Data

US 2021/0141089 A1 May 13, 2021

(30) Foreign Application Priority Data

Nov. 7, 2019 (DE) .......................... 102019217205.9

(51) Int. Cl.
| | |
|---|---|
| *G01S 17/10* | (2020.01) |
| *G01S 7/481* | (2006.01) |
| *G01S 7/484* | (2006.01) |
| *G01S 7/4865* | (2020.01) |
| *G01S 17/89* | (2020.01) |

(52) U.S. Cl.
CPC ............ *G01S 17/10* (2013.01); *G01S 7/4814* (2013.01); *G01S 7/4817* (2013.01); *G01S 7/484* (2013.01); *G01S 7/4865* (2013.01); *G01S 17/89* (2013.01)

(58) Field of Classification Search
CPC ...... G01S 17/10; G01S 7/4814; G01S 7/4817; G01S 7/484; G01S 7/4865; G01S 17/89
See application file for complete search history.

(56) References Cited

U.S. PATENT DOCUMENTS

| | | | |
|---|---|---|---|
| 5,745,437 A | 4/1998 | Wachter et al. | |
| 5,815,250 A | 9/1998 | Thomson et al. | |
| 2011/0298156 A1* | 12/2011 | Hooper | B23K 26/0622 |
| | | | 264/400 |
| 2019/0018107 A1* | 1/2019 | Warke | G01S 7/4865 |
| 2020/0003877 A1* | 1/2020 | Zhu | G01S 7/4817 |
| 2020/0256954 A1* | 8/2020 | Kapusta | G01S 17/10 |
| 2022/0113426 A1* | 4/2022 | Pan | G01S 7/484 |

FOREIGN PATENT DOCUMENTS

| | | |
|---|---|---|
| DE | 102009045429 A1 | 4/2011 |
| EP | 1042688 A2 | 10/2000 |
| WO | 2018127789 A1 | 7/2018 |

OTHER PUBLICATIONS

Newbery, A. R., 1969, A Method for Producing Controllable Double Pulses from a Q-Switched Laser, Opto-Electronics, 1, 134-137 (Year: 1969).*

* cited by examiner

*Primary Examiner* — Isam A Alsomiri
*Assistant Examiner* — Joseph C Fritchman
(74) *Attorney, Agent, or Firm* — NORTON ROSE FULBRIGHT US LLP; Gerard A. Messina

(57) ABSTRACT

An operating method for a LIDAR system. An optical multipulse signal with multiple temporally separate peaks and temporally superimposed peak flanks of temporally directly succeeding peaks is generated on the transmitter side, and is emitted into a visual field as an optical transmission signal. A corresponding control unit, a LIDAR system, and a working device, in particular a vehicle, are also described.

12 Claims, 3 Drawing Sheets

OPERATING METHOD AND CONTROL UNIT FOR A LIDAR SYSTEM, LIDAR SYSTEM, AND DEVICE

CROSS REFERENCE

The present application claims the benefit under 35 U.S.C. § 119 of German Patent Application No. DE 102019217205.9 filed on Nov. 7, 2019, which is expressly incorporated herein by reference in its entirety.

FIELD

The present invention relates to an operating method and a control unit for a LIDAR system, a LIDAR system as such, and a working device that is designed with a LIDAR system, and in particular a vehicle.

BACKGROUND INFORMATION

For detecting the surroundings of working devices and in particular of vehicles, so-called light detection and ranging (LIDAR) systems are being increasingly used which are designed to act on a visual field with light or infrared radiation, that is reflected back from the visual field, for analyzing the visual field and for detecting objects contained therein. For improving LIDAR systems and methods, in particular with regard to better signal identification, among other things multipulse signals for illuminating a visual field to be monitored have been introduced.

SUMMARY

An operating method according to an example embodiment of the present invention for a LIDAR system may have the advantage that 101255842.1 multipulse signals that are used may be identified more clearly with respect to the noise, and also allow a better spatial resolution in monitoring the surroundings. This may be achieved according to an example embodiment of the present invention by providing an operating method for a LIDAR system in which an optical multipulse signal with multiple, in particular temporally separate, peaks and temporally superimposed peak flanks of temporally directly succeeding peaks is generated on the transmitter side, and as an optical transmission signal is emitted into a visual field. The use according to the present invention of multipulse signals, in particular with temporally separate peaks, having temporally superimposed peak flanks on the one hand allows a particularly high degree of distinguishability of the received signals from background noise on the receiver side, and on the other hand allows an increase in the spatial resolution.

Preferred refinements of the present invention are described herein.

Although according to the present invention an arbitrary plurality of pulses may be generated and used in conjunction with a multipulse signal according to the present invention, particularly simple conditions result when, according to one preferred exemplary embodiment of the operating method according to the present invention, a double pulse signal with two, in particular temporally separate, peaks and temporally superimposed peak flanks is generated and emitted as a transmission signal.

Various additional or alternative measures are possible for increasing the identifiability of received signals with respect to the noise and/or further improving the spatial resolution during the monitoring of the visual field.

According to one preferred refinement of the operating method according to the present invention, it is possible for a temporally, in particular directly, preceding, and in particular first, pulse signal to have a comparatively narrow design, and in particular to have a smaller peak width compared to the peak width of a temporally, in particular directly, succeeding pulse signal that is comparatively wide and in particular has a greater peak width compared to the peak width of the temporally, in particular directly, preceding pulse signal.

Additionally or alternatively, the peak width of the temporally, in particular directly, preceding pulse signal may be in the range of approximately $1/20$ to approximately $1/5$, and preferably in the range of approximately $1/10$, of the peak width of the temporally, in particular directly, succeeding pulse signal.

The peak width or pulse width of a temporally preceding pulse or peak may be in the range of 0.5 ns or less. The peak width or pulse width of a temporally succeeding pulse or peak may be in the range of 2 ns or greater.

A particular peak width may be understood as a half-value width of a particular underlying peak.

According to a further alternative or additional refinement of the operating method according to the present invention, a temporally preceding, and in particular a first, pulse signal may have a lower peak height compared to a temporally succeeding, and in particular second, pulse signal.

In particular, the peak heights of temporally directly succeeding pulse signals may be in a ratio having a value of approximately 0.9 or less, preferably having a value of approximately 0.8 or less, and more preferably having a value of approximately 0.6 or less.

According to a further advantageous embodiment, directly succeeding pulse signals in the multipulse signal according to the present invention may have a temporal spacing with respect to the position of the peaks that is in the range of approximately ten times to approximately twenty times the peak width of the first or temporally, in particular directly, preceding pulse signal, and/or in the range of approximately one time to approximately three times the peak width of the second or temporally, in particular directly, succeeding pulse signal.

In particular, the temporal spacing of directly succeeding pulse signals with respect to the temporal position of the peaks may be in the range of one-half or all of the pulse width or peak width of the temporally succeeding pulse. Alternatively, the temporal spacing of directly succeeding pulse signals with respect to the temporal position of the peaks may be in the range of 2 ns or greater.

In principle, any desired light sources may be used for generating the multipulse signals designed according to the present invention.

However, with regard to the measuring accuracy and the reproducibility, particularly suitable conditions result when, according to a further exemplary embodiment of the operating method according to the present invention, for generating the optical transmission signals at least one semiconductor laser is used as the light source of a light source unit.

In particular, the use of multiple light sources and in particular semiconductor lasers is advantageous in certain embodiments of the method according to the present invention and of the underlying system.

Particularly simple operating conditions result when, according to one specific embodiment of the operating method according to the present invention, an individual or single laser device is used as the light source for generating a multiple pulse and in particular a double pulse.

In this individual laser device, for example within the meaning of a semiconductor laser, in a preliminary phase or first phase of its operation, an oscillation build-up, a transient oscillation, and/or a laser resonance may be initially suppressed using a comparatively large amount of energy and/or via a first comparatively high current pulse in the underlying semiconductor element.

This may preferably take place, for example, by using an optical absorber and/or with formation of a comparatively high degree of inversion in the underlying laser device.

In a second phase or main phase of operation of the laser device, by acting in particular with a second current pulse, the suppression of the laser resonance, in particular by the absorber, is then discontinued, and a laser resonance is no longer suppressed.

A pronounced and temporally defined relaxation oscillation is then excited in the laser device, in particular by Q-switching and/or gain switching, and a first temporally, in particular directly, preceding and comparatively narrow pulse signal is generated and emitted.

After the relaxation oscillation, with feeding of additional energy and/or by some other energization, an oscillation build-up or a transient oscillation of the laser device is then effectuated, and a further temporally, in particular directly, succeeding, wider or comparatively wider pulse signal, corresponding to the temporal behavior of the energization, i.e., in particular in relation to the time pattern of the exciting current and/or in temporal overlap with a falling flank of the first pulse signal, is subsequently generated and emitted.

For generating a first or temporally, in particular directly, preceding pulse signal and a second or temporally, in particular directly, succeeding pulse signal, for example an individual light source and in particular an individual laser device and preferably an individual semiconductor laser may be used and operated.

Alternatively, a first light source and a second light source may be used and operated, in particular in a temporally, in particular directly, successive manner, it being possible in particular for a particular light source that is used to be designed as a laser device, and preferably as a semiconductor laser.

Different mechanisms may be employed for controlling and for operating the one or multiple light sources.

For example, according to a further embodiment of the operating method according to the present invention, a driver unit may be used and operated which is configured to effectuate the time sequence of excitations of the one or two light sources, and in particular the one or two laser devices or semiconductor lasers, according to the pulse signals and their sequence.

For this purpose, the driver unit may include a first driver and a second driver that are associated, in particular unambiguously, with the individual light source or the two light sources, the drivers in each case being designed as, or with, a passive oscillating circuit and/or as, or with, a current source.

Moreover, the present invention relates to a control unit for a LIDAR system which is configured to initiate, carry out, cause to run, regulate, and/or control one specific embodiment of the operating method according to the present invention in an underlying LIDAR system.

Furthermore, the present invention relates to a LIDAR system as such, which is designed with a transmitter unit for generating and emitting primary light into a visual field for illuminating same, and a receiver unit for receiving, detecting, and evaluating secondary light from the visual field.

The provided LIDAR system is configured to be used with a method according to the example embodiment(s) of the present invention and/or to be controlled or regulated by such a method.

For this purpose, the LIDAR system is advantageously provided with a control unit that is designed according to the present invention, and is configured to control the operation of the transmitter unit and/or the receiver unit, and in particular to initiate, prompt, carry out, regulate, and/or control a generation/emission of primary light and/or a reception, detection, and evaluation of secondary light.

In one advantageous specific embodiment of the LIDAR system according to the present invention, the receiver unit includes a correlation unit that is configured to detect an emitted pattern or signal pattern in the multipulse signal on the input side.

Lastly, the present invention relates to a working device as such that is provided with a LIDAR system designed according to an example embodiment of present invention, in particular as a vehicle.

BRIEF DESCRIPTION OF THE DRAWINGS

Specific embodiments of the present invention are described in greater detail with reference to the figures.

DETAILED DESCRIPTION OF EXAMPLE EMBODIMENTS

Figure 1:
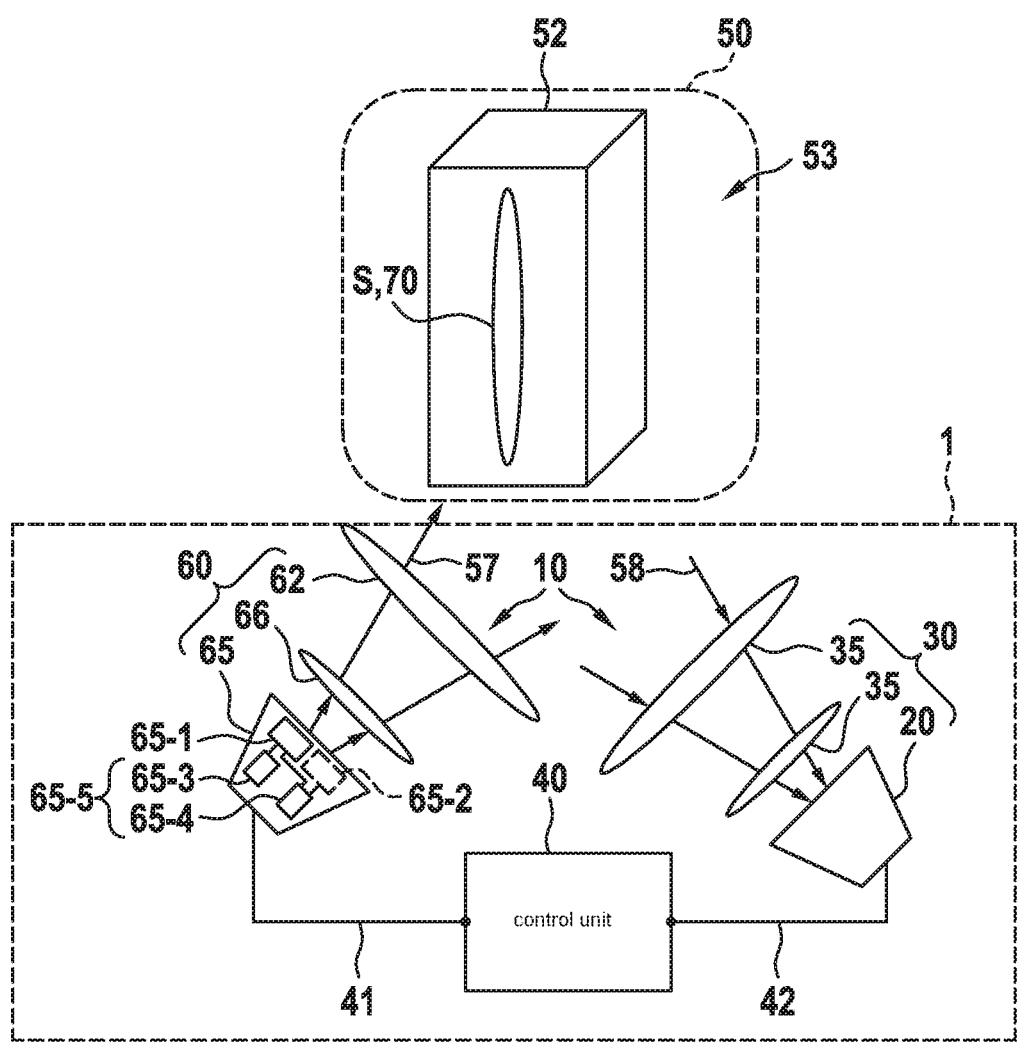
FIG. 1 schematically shows one specific embodiment of a LIDAR system which is designed according to the present invention, and which may be used in conjunction with the operating method according to the present invention.

Exemplary embodiments of the present invention and the technical background are described in greater detail below with reference to FIGS. 1 through 3. Elements and components that are identical and equivalent and that function in an identical or equivalent manner are denoted by the same reference numerals. A detailed description of the denoted elements and components is not provided in each case of their occurrence.

The described features and other properties may be arbitrarily separated from one another and arbitrarily combined with one another without departing from the present invention.

For explaining the present invention, FIG. 1 schematically shows an illustration of one specific embodiment of a LIDAR system 1 which is designed according to the present invention, and which may be used in conjunction with specific embodiments of the operating method according to the present invention.

LIDAR system 1 according to FIG. 1, in conjunction with its optical system 10, includes a transmitter unit 60, which may also be understood as a transmitter optical system, and a receiver unit 30, which may also be understood as a receiver optical system.

A control unit 40 is advantageously provided, via which transmitter unit 60 and receiver unit 30 are operatively connected via detection lines and control lines 41 and 42.

Transmitter unit 60 includes a light source unit 65 for generating and emitting primary light 57, a beam shaping optical system 66 for beam shaping of primary light 57, and a deflection optical system 62 for actually emitting primary light 57 into visual field 50, which includes scene 53 that may contain an object 52, for example.

Receiver unit 30 includes a primary optical system 34, for example in the manner of a lens, and a secondary optical system 35, which includes a receiver-side collimator, for example.

In this regard, it is noted that conventional commercial LIDAR systems in the automotive field as well as numerous conventional development systems are based on the principle of a single-pulse emission on a short-term basis, for example less than approximately 2 μs, at a predetermined solid angle, and detection of objects 52 in a scene 53 in a visual field 50 due to their reflection of emitted primary light 57, via secondary light 58.

The detection takes place via various optical detectors such as APDs, CCDs, SPADs, or SiPMs in the detector system 20, and in particular due to the generation of an electrical signal based on the underlying single pulse emission.

The characteristic shape of the optical pulse is also reflected in the signal shape of the generated electrical signal, in particular at the same time with a temporal folding of the optical pulse due to a spatial shift (tilting, for example) of object 52 to be detected in scene 53 of visual field 50. A correlation may be made between the characteristic of the emitted signal shape and the detected signal.

The optical signals generally have a Gaussian-like or sine-like characteristic. The reason for this signal shape is the current conduction during the optical signal generation in the transmitter module, which may also be understood as a transmitting unit 60.

Figure 2:
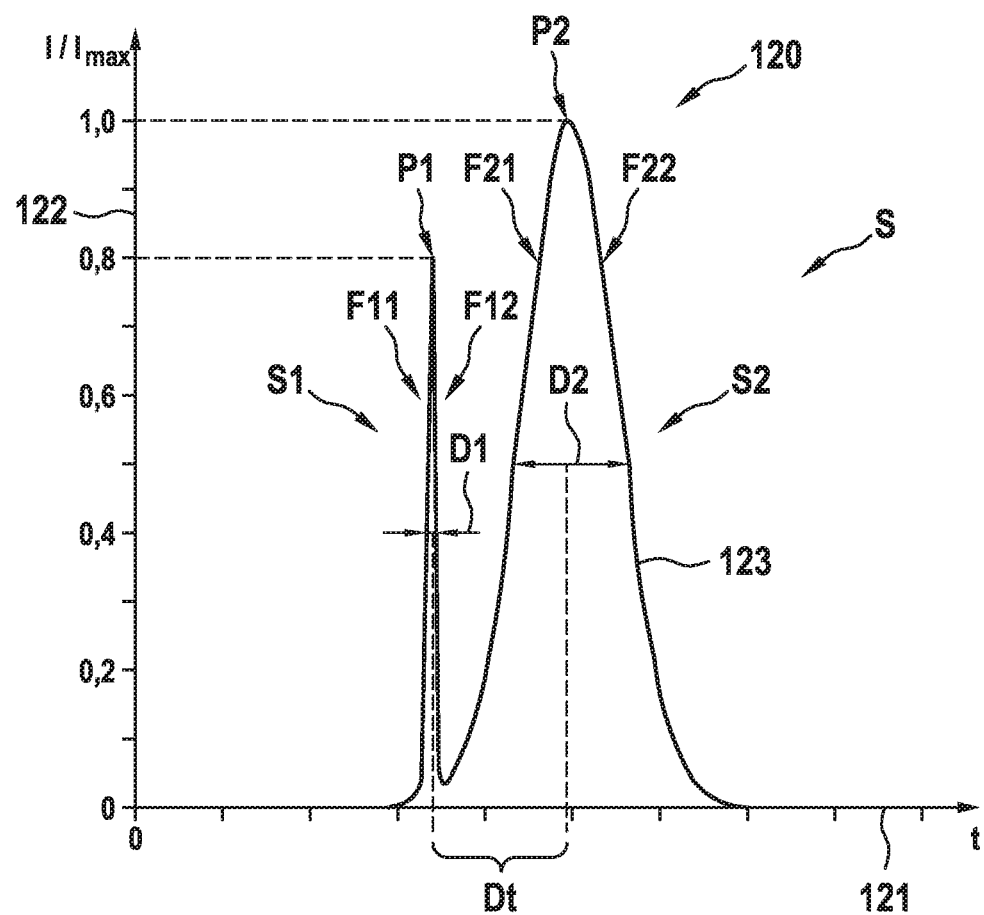
FIGS. 2 and 3 illustrate, in the form of graphs, signal shapes for specific embodiments of multipulse signals generated according to the present invention.
Figure 3:
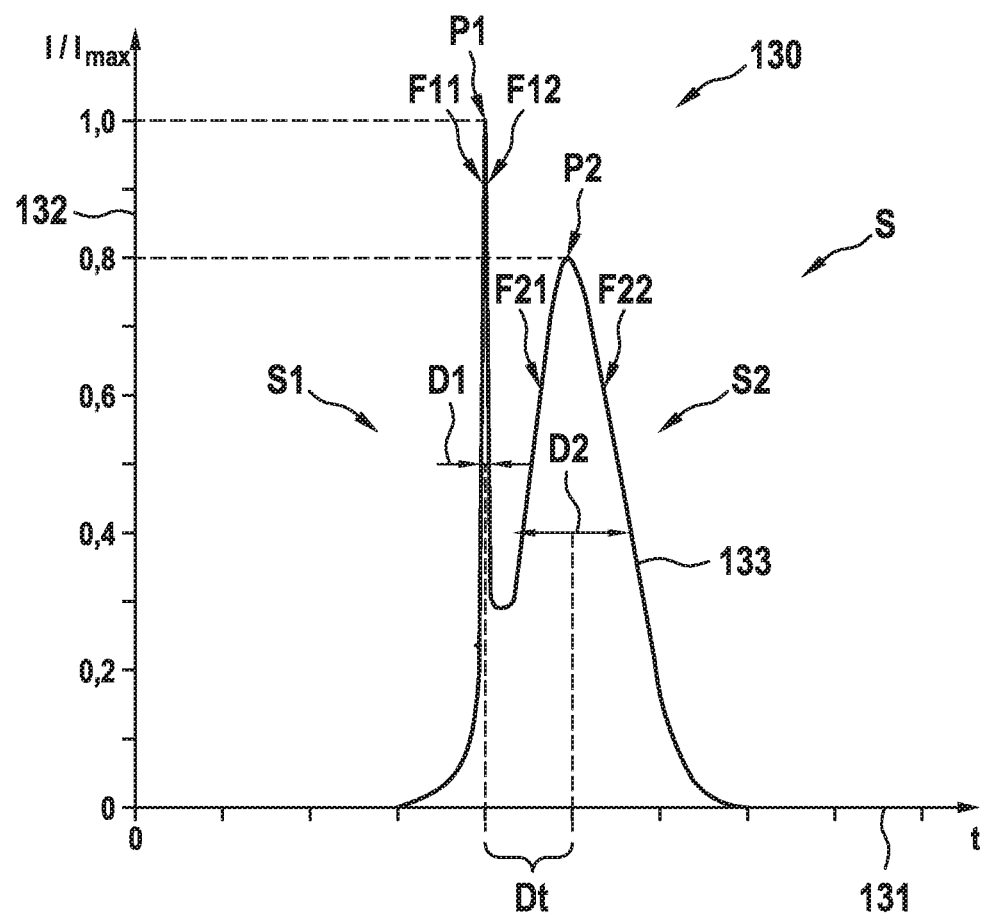

In this regard, FIGS. 2 and 3 schematically show, in the form of graphs 120 and 130, signal shapes in the form of tracks 123, 133, respectively, for specific embodiments of multipulse signals S that are generated according to the present invention, including a first pulse signal S1 and a second pulse signal S2, namely, including a peak P1, P2, respectively, which is enclosed or encompassed by first, temporally earlier, rising flanks F11 and F21 and by second, temporally later, falling flanks F12 and F22.

Modifying the current conduction changes the characteristic of optical transmission signal S, in particular, for example, from a Gaussian-shaped form of the intensity curve over time in such a way that according to the present invention, two different pulses or pulse signals S1 and S2 that are generated in direct succession are emitted, namely, with a double peak characteristic according to the present invention including a first peak P1 of first pulse signal S1 and including a second peak P2 of second pulse signal S2, these pulse signals, which are generated according to the present invention in a direct temporal sequence, being emitted in such a way that according to the illustration in FIGS. 2 and 3, a second, temporally late, falling flank F12 of first pulse signal S1 after first peak P1 temporally overlaps with a first, temporally early, rising flank F21 of second pulse signal S2.

Due to emitting a double pulse within a comparatively short time, an improved and/or more robust correlation may be made, with implementation of a corresponding correlation function for increasing the likelihood of detection, since double pulse signals, as a transmission signal S with a signal-specific spacing as an interference signal and/or noise, are much more unlikely than a single pulse signal.

A special feature of one specific embodiment of the pulse generation according to the present invention is that only one type of beam source or light source 65-1, 65-2 may possibly be necessary in light source unit 65.

In particular, as mentioned above, in one preferred specific embodiment of the present invention a single or individual light source 65-1, for example in the sense of a semiconductor laser, may be sufficient to generate and emit both pulse signals S1 and S2 of the double pulse signal as transmission signal S.

Example embodiments of the present invention may result in the advantages of
 a better receiver-side identification of the signal from the noise and
 a better receiver-side spatial resolution due to the different pulse widths of particular single pulses S1 and S2.

The generation of the double pulse signal as transmission signal S may be based on the ultrashort pulse concept with the aid of a switchable absorber in the underlying semiconductor and/or the combination of a diode driver with high current conduction over a brief period of time, for example in the nanosecond range.

An ultrashort pulse may be achieved, for example, by relaxation oscillation of an individual underlying semiconductor laser 65-1.

Providing an absorber prevents a temporally early oscillation build-up or transient oscillation of underlying laser 65-1 during the energization, resulting in a high degree of inversion.

As the result of a second current pulse, the suppressing effect of the absorber may be discontinued, resulting in a pronounced, temporally defined relaxation oscillation, for example via Q-switching, with the generation and emission of a first, comparatively narrow pulse signal S1.

A further variant is the utilization of the relaxation oscillation by gain switching, with or without an absorber.

Due to further energization after the relaxation oscillation, semiconductor laser 65-1 of the lasers build up an oscillation or reach a transient oscillation, and a fairly long radiation emission takes place as a second, comparatively longer pulse signal S2, in particular corresponding to the temporal behavior of the applied current.

For creating the behavior, corresponding drivers 65-3 and 65-4 of a higher-order driver unit 65-5, for example necessary as a laser diode driver, are advantageously designed, for example, with two separately controllable currents, in particular in the sense of a two-section laser diode driver.

These drivers 65-3 and 65-4 may be implemented, for example, as diode drivers based on a passive oscillating circuit and/or a current source.

Both drivers 65-3 and 65-4 may be utilized in a circuit for current conduction for a diode.

In this regard, FIG. 1 shows in conjunction with light source unit 65 one specific embodiment that includes a single light source 65-1 in the form of a semiconductor laser, which includes a driver unit 65-5 including a first driver 65-3 for generating a first pulse signal or signal pulse S1 with a peak P1, rising flank F11, and falling flank F12, and for generating a second pulse signal or signal pulse S2 with a peak P2, rising flank F21, and falling flank F22, as illustrated in FIGS. 2 and 3.

A further alternative is the very precise temporal coordination of two separate semiconductor lasers 65-1, 65-2 as light sources for generating a double pulse pattern of the double pulse signal as transmission signal S from two individual pulse signals S1 and S2.

In this regard, FIG. 1 shows a further alternative, in which in addition to first semiconductor light source 65-1 a second semiconductor light source 65-2 is provided, the latter being illustrated in dashed lines in FIG. 1. In this case, there may be a 1-to-1 association between drivers 65-3, 65-4 of driver unit 65-5 and light sources 65-1 and 65-2 of light source unit 65.

In graphs 120 and 130 in FIGS. 2 and 3, respectively, time t is plotted in fixed time units on abscissas 121, 131, and relative normalized amplitude ratio I/Imax of intensity I, namely, in a ratio with maximum intensity Imax, is plotted on ordinates 122, 132. Tracks 123 and 133 show double pulse signals, generated and formed according to the present invention, as transmission signal S with overlapping individual pulse signals S1 and S2, including peaks P1 and P2, in adjacent flanks F12 and F21.

Pulse widths or peak widths D1 and D2 and pulse spacing Dt as well as pulse heights or peaks P1 and P2 in each case have ratios to one another as designed according to the present invention, as described in detail above.

What is claimed is:

1. An operating method for a LIDAR system, the method comprising the following steps:
    generating an optical multipulse signal with multiple temporally separate peaks and temporally superimposed peak flanks of temporally directly succeeding peaks; and
    emitting into a visual field the optical multiple signal as an optical transmission signal, wherein the optical multipulse signal is a double pulse signal with two temporally separate peaks and temporally superimposed peak flanks, wherein a temporally preceding first pulse signal of the double pulse signal has a smaller peak width compared to a peak width of a temporally succeeding pulse signal of the double pulse signal, and wherein the peak of the temporally preceding first pulse precedes an earliest one of the temporally superimposed peak flank of the temporally succeeding pulse signal.

2. The operating method as recited in claim 1 wherein:
    (i) the peak width of the temporally preceding pulse signal is in the range of approximately ½₀ to approximately ⅕ of the peak width of the temporally succeeding pulse signal, and/or
    (ii) the peak width of the temporally preceding pulse or the peak width of the temporally succeeding pulse is a half-value width of an underlying peak.

3. The operating method as recited in claim 1, wherein the peak width of the temporally preceding pulse signal is approximately ¹⁄₁₀ of the peak width of the temporally succeeding pulse signal.

4. The operating method as recited in claim 1, wherein a temporally preceding first pulse signal of the double pulse signal, compared to a temporally succeeding second pulse signal of the double pulse signal:
    has a lower peak height in a ratio having a value of approximately 0.9 or less, and/or
    with respect to positions of the peaks, has a temporal spacing that: (i) is in a range of approximately ten times to approximately twenty times the peak width of the temporally preceding first pulse signal, and/or (ii) is in the range of approximately one time to approximately three times the peak width of the temporally succeeding second pulse signal.

5. The operating method as recited in claim 1, wherein a temporally preceding first pulse signal of the double pulse signal, compared to a temporally succeeding second pulse signal of the double pulse signal, has a lower peak height in a ratio having a value of approximately 0.8 or less, and/or having a value of approximately 0.6 or less.

6. The operating method as recited in claim 1, wherein for generating the optical multipulse signal, at least one semiconductor laser is used as a light source of a light source unit.

7. The operating method as recited in claim 1, wherein in an underlying individual laser device as a light source for generating the double pulse signal:
    (i) in a preliminary phase or first phase of its operation, a laser resonance is initially suppressed in an underlying semiconductor element of the laser device by using an optical absorber, and
    (ii) in a second phase or main phase of operation of the laser device,
        (ii-1) by acting with a second current pulse, the suppression of the laser resonance by the absorber is then discontinued, and the laser resonance is no longer suppressed,
        (ii-2) a pronounced and temporally defined relaxation oscillation is excited in the laser device by Q-switching and/or gain switching, and a first, comparatively narrow pulse signal is generated and emitted, and
        (ii-3) after the relaxation oscillation, with feeding of additional energy and/or by some other energization, a transient oscillation of the laser device is then effectuated, and a further comparatively wider pulse signal, corresponding to a temporal behavior of the energization in temporal overlap with a falling flank of the first pulse signal, is generated and emitted.

8. The operating method as recited in claim 1, wherein for generating a first or temporally preceding pulse signal of the double pulse signal and a second or temporally succeeding pulse signal of the double pulse signal:
    using and operating:
        an individual semiconductor laser is used and operated, or
        a first light source and a second light source that are semiconductor lasers, and
    using and operating a driver unit, wherein the driver unit is configured to effectuate a time sequence of excitations of the semiconductor lasers, according to pulse signals of the double pulse signal and their sequence, and/or the driver unit includes a first driver and a second driver that are unambiguously associated with the first and second light source, the first and second drivers in each case being configured as, or with, a passive oscillating circuit and/or as or with, a current source.

9. A control unit for a LIDAR system, the control unit configured to control the LIDAR system to:
    generate an optical multipulse signal with multiple temporally separate peaks and temporally superimposed peak flanks of temporally directly succeeding peaks; and
    emit into a visual field the optical multiple signal as an optical transmission signal, wherein the optical multipulse signal is a double pulse signal with two temporally separate peaks and temporally superimposed peak flanks, wherein a temporally preceding first pulse signal of the double pulse signal has a smaller peak width compared to a peak width of a temporally succeeding pulse signal of the double pulse signal, and wherein the peak of the temporally preceding first pulse precedes an earliest one of the temporally superimposed peak flank of the temporally succeeding pulse signal.

10. A LIDAR system, comprising:
    a transmitter unit configured to generate and emit primary light into a visual field for illuminating the visual field;

a receiver unit configured to receive, detect, and evaluate secondary light from the visual field; and a control unit configured to control the LIDAR system to:

generate an optical multipulse signal with multiple temporally separate peaks and temporally superimposed peak flanks of temporally directly succeeding peaks; and emit into a visual field the optical multiple signal as an optical transmission signal, wherein the optical multipulse signal is a double pulse signal with two temporally separate peaks and temporally superimposed peak flanks, wherein a temporally preceding first pulse signal of the double pulse signal has a smaller peak width compared to a peak width of a temporally succeeding pulse signal of the double pulse signal, and wherein the peak of the temporally preceding first pulse precedes an earliest one of the temporally superimposed peak flank of the temporally succeeding pulse signal.

11. A working device, comprising:

a LIDAR system, including:

a transmitter unit configured to generate and emit primary light into a visual field for illuminating the visual field;

a receiver unit configured to receive, detect, and evaluate secondary light from the visual field; and a control unit configured to control the LIDAR system to:

generate an optical multipulse signal with multiple temporally separate peaks and temporally superimposed peak flanks of temporally directly succeeding peaks; and emit into a visual field the optical multiple signal as an optical transmission signal, wherein the optical multipulse signal is a double pulse signal with two temporally separate peaks and temporally superimposed peak flanks, wherein a temporally preceding first pulse signal of the double pulse signal has a smaller peak width compared to a peak width of a temporally succeeding pulse signal of the double pulse signal, and wherein the peak of the temporally preceding first pulse precedes an earliest one of the temporally superimposed peak flank of the temporally succeeding pulse signal.

12. The working device as cited in claim 11, wherein the working device is a vehicle.

* * * * *